US006679507B1

United States Patent
Ahm

(10) Patent No.: US 6,679,507 B1
(45) Date of Patent: Jan. 20, 2004

(54) COMBINED CARRIER AND TRANSPORT UNIT FOR USE IN CONNECTION WITH GERMINATION SEED TAPES

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 10/019,241

(22) PCT Filed: Jun. 23, 2000

(86) PCT No.: PCT/DK00/00336

§ 371 (c)(1),
(2), (4) Date: Dec. 21, 2001

(87) PCT Pub. No.: WO01/00004

PCT Pub. Date: Jan. 4, 2001

(30) Foreign Application Priority Data

Jun. 24, 1999 (DK) .................................. 1999 00905

(51) Int. Cl.[7] ................................................. B62B 1/00
(52) U.S. Cl. ............................... 280/79.3; 220/6; 220/7
(58) Field of Search ............................ 280/79.3; 220/6, 220/7

(56) References Cited

U.S. PATENT DOCUMENTS 2,478,458 A * 8/1949 Carter, Sr. et al. ....... 211/71.01
3,330,576 A * 7/1967 Willis ......................... 280/79.3
4,163,495 A * 8/1979 Drader ......................... 206/506
5,398,834 A * 3/1995 Umiker ........................... 220/6
5,515,987 A * 5/1996 Jacques et al. .................. 220/6
5,746,342 A * 5/1998 Jacques et al. .................. 220/6
5,875,904 A * 3/1999 Vorstenbosch .............. 211/180
6,131,757 A * 10/2000 Clark et al. ..................... 220/7
6,155,444 A * 12/2000 Liu ................................. 220/7

* cited by examiner

Primary Examiner—Brian L. Johnson
Assistant Examiner—J. Allen Shriver
(74) Attorney, Agent, or Firm—Cooper & Dunham LLP; Donald S. Dowden

(57) ABSTRACT

A combined carrier and transport unit is open at the top and has a perforated bottom. The unit is made of sheet material and has a substantially U-shaped cross section. The bottom of the U forms the bottom wall of the unit and the two sides of the U form side supporting walls for a seed tape that can be folded and placed edgewise on the bottom wall. Connecting members are provided in the transition area between the bottom wall and each side supporting wall. These connecting members can be bent outwards and downwards so that the side walls and the bottom wall are on the same level when the unit is not in use, and can be bent upwards when the unit is in use. The resulting unit is very light, and in the empty piled state it requires very little room.

18 Claims, 4 Drawing Sheets

COMBINED CARRIER AND TRANSPORT UNIT FOR USE IN CONNECTION WITH GERMINATION SEED TAPES

TECHNICAL FIELD

The invention relates to a combined carrier and transport unit for use in connection with germination of seed tapes and a later bedding out of said seed tapes by means of a planting machine, said combined carrier and transport unit being open at the top and comprising a perforated bottom wall.

BACKGROUND ART

Combined carrier and transport units have been known for a long time in connection with machines for bedding out plants, possibly small trees, where each plant is positioned in a small container and where the combined carrier and transport unit then comprises a plurality of such juxtaposed containers. The bedding out usually involves the use of a very high number of combined carrier and transport units, and after said combined carrier and transport units have been emptied they can indeed be piled atop one another, but not inside one another, viz. being nested. Accordingly, these combined carrier and transport units are encumbered with the disadvantageous draw-back of taking up a very large volume.

BRIEF DESCRIPTION OF THE INVENTION

The object of the invention is to provide a combined carrier and transport unit of the above type which is very light and which in addition in the piled empty state requires very little room.

The combined carrier and transport unit according to the invention is characterised in that it is made of sheet material and is of a substantially U-shaped cross section, where the bottom web of the U forms the bottom wall of the unit, and where the two side webs of the U form side supporting walls for the seed tape which can be zigzag folded and placed edgewise on said bottom wall, and that connecting members are provided in the transition area between the bottom wall and each side supporting wall, said connecting members being adapted to be folded in such a manner that said side supporting walls and said bottom wall are positioned on the same level when the unit is not in use, and that when the unit is in use tight side supporting tapes are provided between opposing ends of said side supporting walls so as to additionally support the seed tape from the side. The resulting combined carrier and transport unit is very light due to the high number of holes. In addition, it has much room for a zigzag folded seed tape. In particular it should be noted that when the unit has been emptied and is not in use, it requires very little room because in this state the unit can be completely flattened as the side supporting walls can be folded outwards and downwards so as to flush with the the bottom wall. Several units piled atop one another take up minimum room. When the carrier and transport unit is to be used again, the side supporting walls are bent upwards so as to form an angle of approximately 90° with the the bottom wall and the side supporting band is put tightly about the entire unit, said band abutting said side supporting walls. The seed tape is positioned edgewise and zigzag folded on the the bottom wall. After the germination, the seed tape can be bedded out by the unit being arranged on a planting machine known per se, whereafter said seed tape can be gradually pulled off said unit. In addition the carrier and transport unit is environmentally friendly because the user is not tempted to throw away the unit in the open after use.

The sheet material may according to the invention be a thin sheet of aluminium or soft steel, preferably of a thickness of 0.60 to 0.70 mm. As a result the said side supporting walls can typically tolerate a bending up and downwards approximately eight times before they break off, and accordingly the carrier and transport unit is provided with a reasonable durability.

Moreover, a plurality of holes may be punched out in the bottom wall so as to form a grating, whereby the connecting members may be relatively narrow bridge pieces resulting from a punching out of a plurality of narrow oblong holes at short regular intervals in said transition area. As a result the connecting members are particularly easy to handle with the effect that the side supporting walls can tolerate a higher number of up and downward bendings than previously.

The connecting members may according to the invention be formed by hinges, such as pivot hinges, between the side supporting walls of the walls and the bottom wall as well as reinforcing angle braces arranged at at least one end of each side wall. As a result the carrier and transport unit is particularly durable because it can be reused a high number of times.

Furthermore, the sheet material used may according to the invention be made of plastics, preferably polyethylene, whereby the connecting members of the transition area can easily be formed by thin metal wire nets embedded in said plastics and preferably made of thin wires, or merely by separate thin metal wires arranged in parallel. The resulting carrier and transport unit is inexpensive to manufacture at the same time as it is very strong.

Moreover, the plastics used may according to the invention be expanded plastics, preferably a laminate of polypropylene and polyethylene, which turned out to be particularly advantageous.

According to the invention the connecting members may be formed by film hinges, whereby the carrier and transport unit is particularly simple.

The side supporting band may according to the invention be a band preferably made of plastics and for instance provided with an adhesive on one side, said side supporting band being wound tightly about the unit and adhering to the side supporting members by the adhesive portions opposite said side supporting members. As a result the carrier and transport unit is particularly easy to handle during the bedding out because then it is only necessary to break the band in order to pull out the seed tape sideways from the unit, said seed tape sliding across the bottom wall.

The bottom web of the U may according to the invention present a slightly concave curvature towards the interior of the U, whereby the bottom wall of the carrier and transport unit does not "sack" during the load of the seed tape, but be substantially planar.

In addition, the side supporting walls may according to the invention at one or both ends be extended a distance beyond the the bottom wall, and the extended portion may be bent inwards towards one of the centre lines of said the bottom wall. As a result a kind of "opening" can be formed on the carrier and transport unit, and the germinated seed tape can be pulled out of said opening when the bedding out is to be carried out.

According to the invention the bottom wall may be zigzag folded when seen in cross section, whereby each fold of the zigzag shape can be less than 0.2 times the height of the side supporting walls. In this manner the common contact area between the seed tape placed edgewise and the bottom wall of the carrier and transport unit is rather small with the result that the pulling out of said seed tape from the carrier and transport unit has been facilitated during the bedding out.

Moreover, the side supporting walls may according to the invention be of a height substantially corresponding to the width of the seed tape, and preferably a few mm higher than the width of said tape. Such a height of the side supporting walls turned out to be particularly advantageous.

According to the invention the side supporting walls may be equally high and preferably of a height less than 7 cm, whereas the bottom wall may be of a width of 30 to 50 cm, preferably 40 cm, and a length of 70 to 90 cm, preferably 80 cm. The resulting carrier and transport unit is of such a size that it can be placed on most types of pallets.

According to the invention the adhesive tape is advantageously of a width of 1.5 to 2.5 cm, preferably 2 cm.

Moreover it is according to the invention possible that the side supporting walls comprise at least one recess or at least one hole to be used by the moving or positioning of the unit.

In addition, the sheet material may according to the invention be metal sheet coated with plastics, preferably polyethylene, whereby especially the bottom wall of the carrier and transport unit is particularly smooth with the effect that the germinated seed tape is particularly easy to pull out of the unit.

According to the invention the sheet material may exclusively be made of a polypropylene with the result that the side supporting walls tolerate a bending up and downwards a very high number of times.

The invention relates also to a rack for storing a plurality of carrier and transport units according to the invention, and this rack is characterised in that it comprises four substantially vertical posts interconnected by means of two interspaced frames, and that a plurality of holes arranged atop one another are provided on the inner side of said posts, and that a releasable, possibly pivotal carrier is provided opposite each hole, said carrier for instance being in form of a pivot displaceable through each hole and capable of sliding into or below a carrier and transport unit when the latter is positioned in the rack where said carrier and transport unit forms a shelf in said rack. As a result a very reliable storing of the carrier and transport units is obtained as well as of the associated seed tapes during the germination of the seeds in said seed tapes.

Finally, the posts of the rack may according to the invention comprise wheels with the result that the carrier and transport units in said rack can easily be moved around in a greenhouse for the germination, in which the seed tape is to be subjected to a germination.

BRIEF DESCRIPTION OF THE DRAWINGS

The invention is explained in detail below with reference to the accompanying drawings, in which.

BEST MODE FOR CARRYING OUT THE INVENTION

Figure 1:
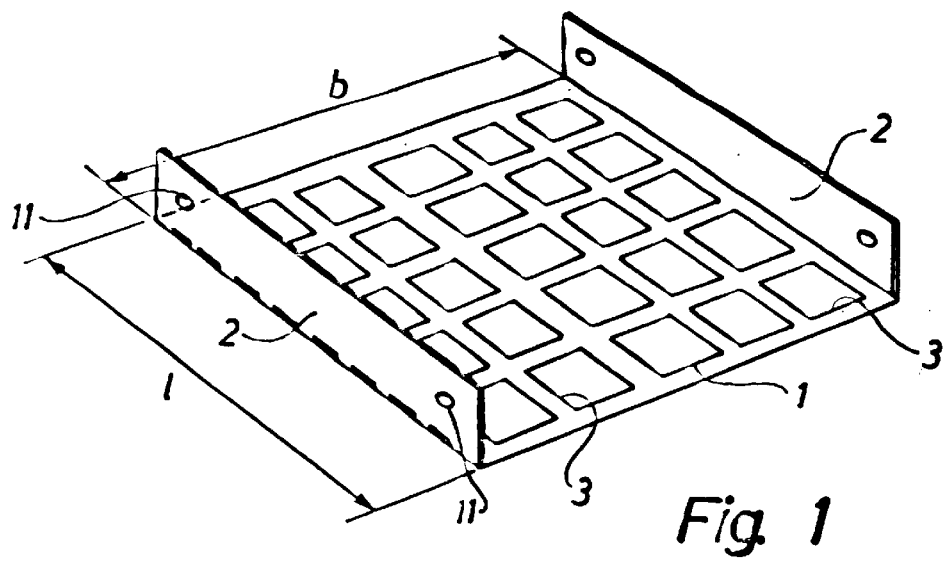
FIG. 1 is a perspective view of an embodiment of the carrier and transport unit according to the invention.
Figure 3:
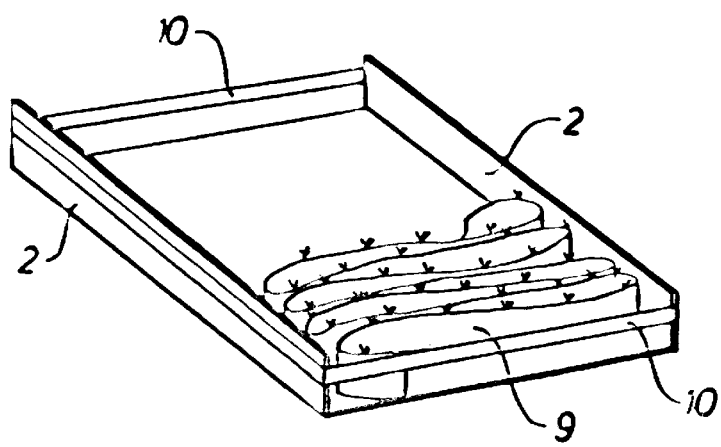
FIG. 3 is a perspective view of the carrier and transport unit of FIG. 1 filled with a seed tape, and where a side supporting band has been arranged tightly about said unit.

The carrier and transport unit shown in FIG. 1 is intended to be used for germination of seed tapes and a later bedding out of said seed tapes by means of a planting machine. The carrier and transport unit comprises a length of sheet material of a substantially U-shaped cross section. The bottom web of the U forms a bottom wall 1 in the unit, and the two side webs of said U form side supporting walls 2 for the seed tape. FIG. 3 shows an embodiment of the carrier and transport unit and illustrates how a seed tape 9 placed edgewise can be placed on the bottom wall of the said carrier and transport unit, said seed tape being zigzag folded. Such a zigzag folding is, however, not absolutely necessary.

The bottom wall 1 is perforated, viz. comprises a high number of small holes 3.

Figure 2:
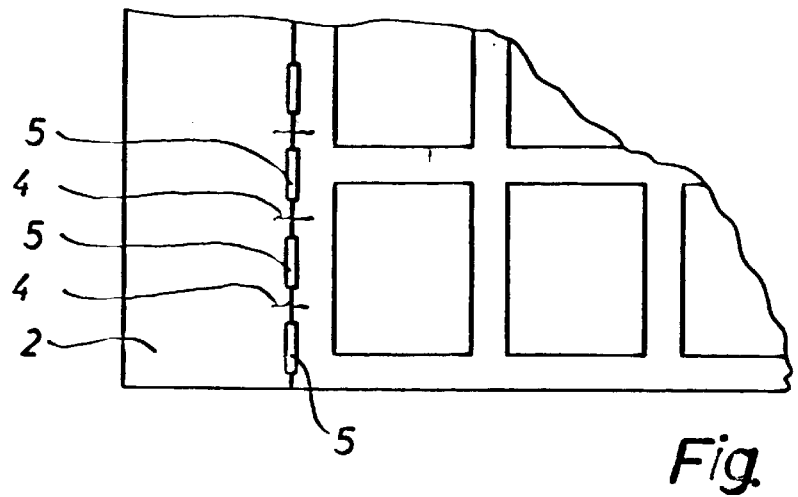
FIG. 2 illustrates on a larger scale a corner of the carrier and transport unit of FIG. 1, the side supporting wall of said unit being bent outwards and downwards so as to flush with the bottom wall of said unit.

As illustrated in FIG. 2, connecting members are provided in the transition area between the bottom wall 3 and each supporting wall 2. These connecting members can be in form of a plurality of narrow bridge pieces 4 arranged between some oblong holes 5. The connecting members are adapted so as to be bendable when the unit is not in use whereby the side supporting wall 2 and the bottom wall 1 are placed on the same level. As a result, a high number of flattened carrier and transport units only take up little room when they are piled atop one another. When the carrier and transport unit is to be used, the side supporting walls 2 are bent upwards, cf. FIG. 1.

As illustrated in FIG. 3, a side supporting band 10 can be provided in form of a band, preferably made of plastics and for instance provided with adhesive on one side, said side supporting band being placed tightly about the carrier and transport unit and serving to provide the seed tape 9 with an additional support from the side.

The sheet material can be a thin sheet of aluminium or soft steel, preferably of a thickness of 0.60 to 0.70 mm. The holes 3 can be arranged such that the bottom wall forms a grating, cf. FIG. 1. These holes 3 and 5 are usually manufactured by way of punching.

Figure 4:
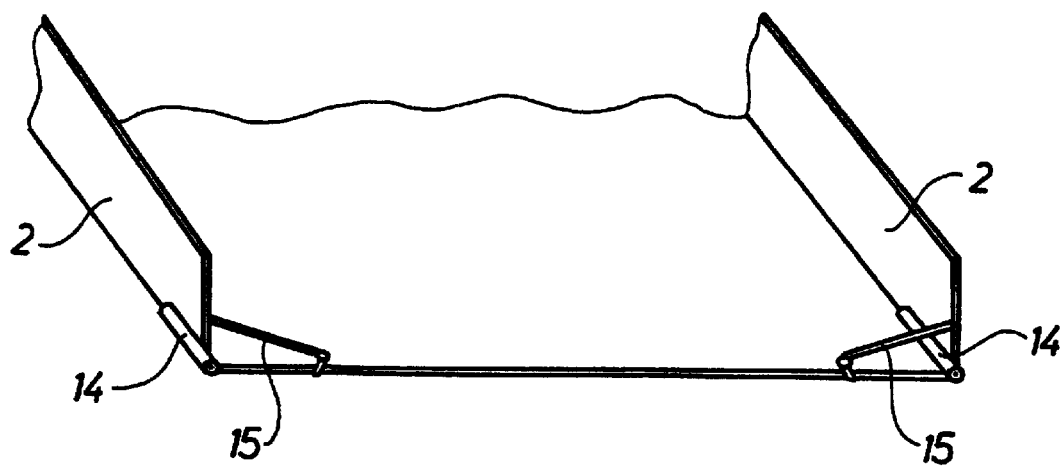
FIG. 4 is a perspective view of a second embodiment of the carrier and transport unit according to the invention, where the side supporting walls have been hinged to the bottom wall of said unit.

As shown in FIG. 4, the connecting members can be formed by pivots 14 as well as reinforcing angle braces 15 hinged thereon at at least one end of each side wall.

The sheet material used can also be made of plastics, such as polyethylene. Then the connecting members can be formed by metal wires 4' cast into the plastics. These wires can, if desired, form part of one or more of the above bridge pieces 4, cf. FIG. 1.

It is also possible that these connecting members are formed by film hinges.

The side supporting band shown in FIG. 3 can preferably be an adhesive tape, preferably made of plastics and wound tightly about the entire unit. This band adheres to the side supporting walls 2, but pass freely in the air in the space between the side walls.

Figure 5:
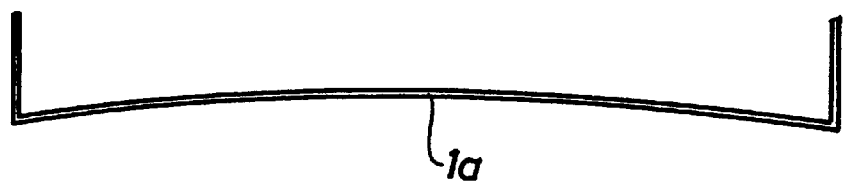
FIG. 5 is a cross sectional view of a third embodiment of the unit according to the invention and clearly showing that the bottom web is slightly curved upwards.
Figure 6:
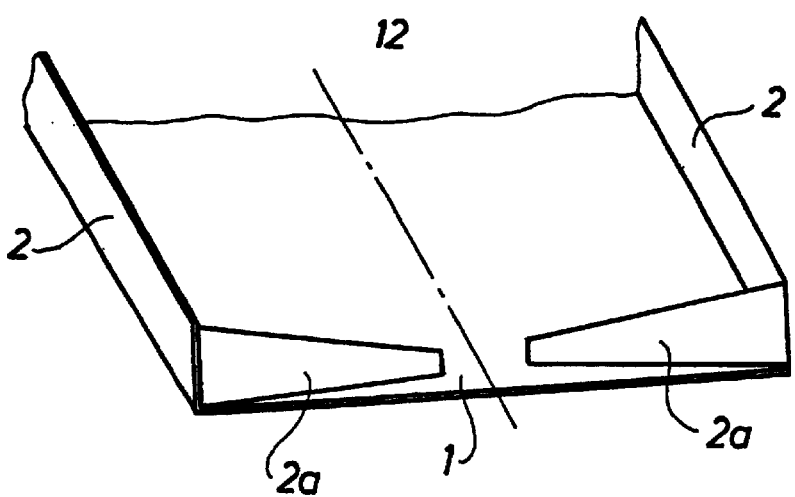
FIG. 6 is a perspective view of a fourth embodiment of the carrier and transport unit according to the invention, where the side supporting walls have been extended and bent inwards towards the centre line of the unit.

FIG. 5 is a cross sectional view of yet another embodiment of the carrier and transport unit. The cross section is U-shaped, and it appears clearly that the bottom web 1a of the U presents a slightly concave curvature towards the interior of the U. FIG. 6 shows how the side supporting walls 2 at one end can be extended a length beyond the bottom wall 1, cf. the extended lengths 2a. These extended length have been bent inwards towards the centre line 12 of the bottom wall 1.

Figure 7:
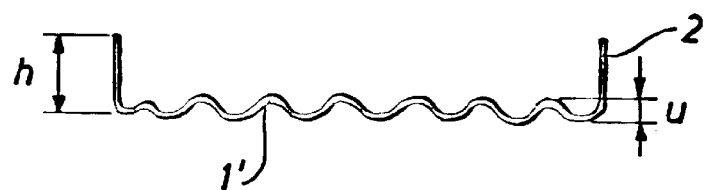
FIG. 7 is a cross sectional view of a fifth embodiment of the carrier and transport unit according to the invention, where it is shown how the bottom web of the U can be zigzag folded.

FIG. 7 illustrates the substantially U-shaped cross section of an additional embodiment of the carrier and transport unit according to the invention. The bottom web 1' of the U is here zigzag folded, and each fold u of the zigzag folding can be less than 0.2 times the height h of the side supporting wall 2.

The side supporting walls can be of a height substantially corresponding to the width of the seed tape, but is preferably a few mm higher than the width of said tape. The side supporting walls 2 are equally high and preferably of a height h less than 7 cm, whereas the bottom wall is of a width b of 30 to 50 cm, preferably 40 cm, and a length l of 70 to 90 cm, preferably 80 cm.

The adhesive tape is of a width of 1.5 to 2.5 cm, preferably 2 cm.

As illustrated in FIG. 1 the side supporting walls 2 comprise at least one recess or at least one hole 11 to be used by the moving or positioning of the unit.

The carrier and transport unit can, if desired, be made of metal sheet coated with plastics, preferably polyethylene.

Figure 8:
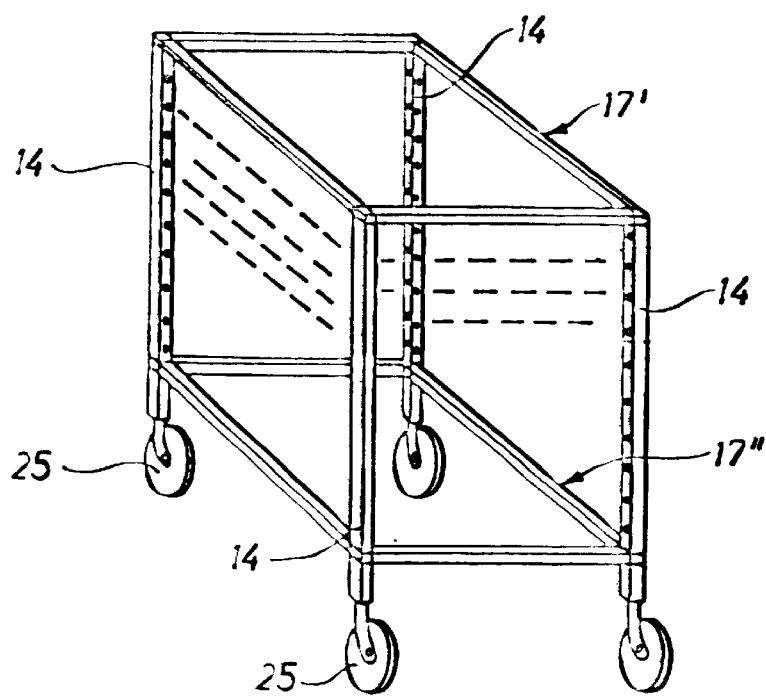
FIG. 8 is a perspective view of a rack according to the invention for storing a plurality of carrier and transport units according to the invention.
Figure 9:
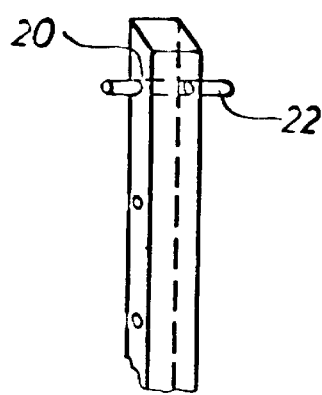
FIG. 9 is a perspective view of a portion of a post with a carrier.

FIG. 8 shows a rack for storing a plurality of carrier and transport units according to the invention. The rack comprises four substantially vertical posts 14 interconnected by means of two interspaced frames 17' and 17". A plurality of opposing holes 20 are provided on the inner side of the posts 14, cf. FIG. 9. A releasable, possibly displaceable carrier is provided on the posts opposite each hole. This carrier is for instance in form of a pivot 22 displaceable through each hole and capable of sliding into a carrier and transport unit, such as one of the holes 11 of the unit, when said unit is to be placed in the rack. The pivot can, if desired, merely slide below the carrier and transport unit.

As shown in FIG. 8, the posts 14 can at the bottom be provided with wheels 25 with the result that it is very easy to move the rack around inside a germination house.

Figure 10:
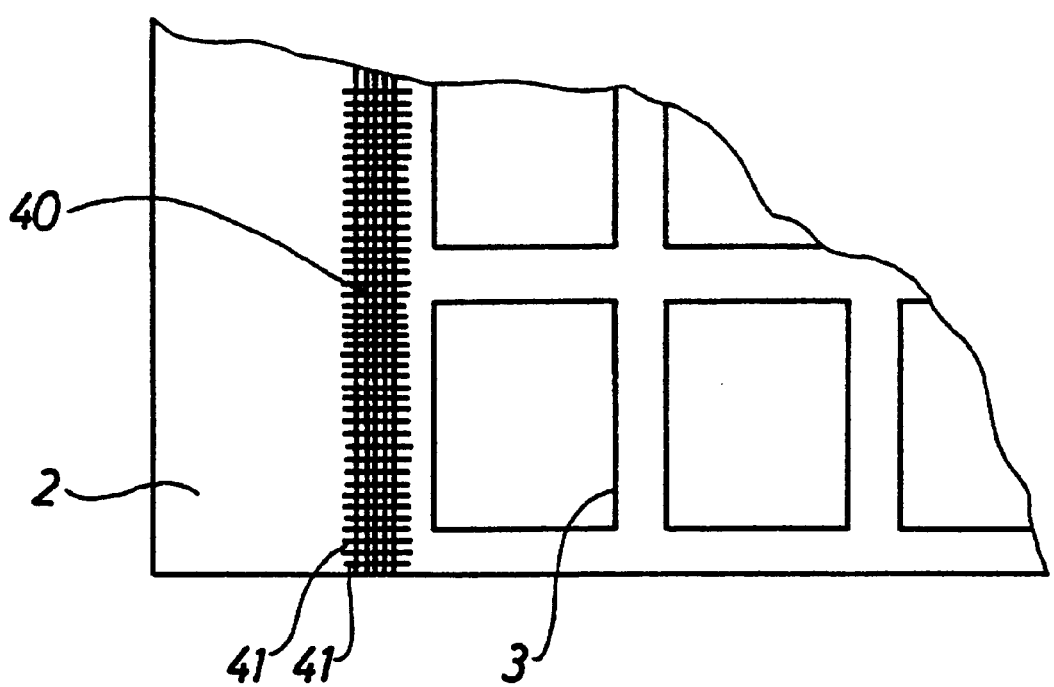
FIG. 10 illustrates a corner of an embodiment of the carrier and transport unit, the transition area including a metal wire net.

FIG. 10 shows how the plastic sheet material of the carrier and transport unit can be for instance a plastic laminate, such as a laminate of polypropylene and polyethylene, where the connecting members of the transition area are formed by a metal wire net 40 of relatively thin wires. The metal wire net can optionally extend through the entire sheet. Many parallel metal wires can also be used, such as for instance the thin metal wires 41 of FIG. 10. The transverse metal wires are then omitted.

The sheet material can possibly be made exclusively of polypropylene.

The sheet material used can also be made of expanded plastics, viz. plastics with open or closed cells, which makes the carrier and transport unit relatively light. The latter unit is also environmentally friendly because it does not require the use of much plastics. The sheet material is typically of a thickness of 3 to 6 mm.

As the carrier and transport unit does not comprise dirt-trapping corners, it is very easy to clean.

The invention may be modified in many ways without thereby deviating from scope of the invention.

What is claimed is:

1. A carrier and transport unit for use in connection with germination of seed tapes (9) and a later bedding out of said seed tapes by means of a planting machine, said unit being open at the top and comprising a perforated bottom wall (1), characterised in that it is made of sheet material and has a cross section substantially shaped as a U, where a bottom web of the U forms the bottom wall (1) of the unit, and two side webs of the U form side supporting walls (2) for the seed tape (9), which seed tape can be zigzag folded and placed edgewise on said bottom wall (1), and that connecting members (4) are provided in a transition area between the bottom wall (1) and each side supporting wall (2), said connecting members being adapted when the unit is not in use to be folded in such a manner that the side supporting walls (2) and the bottom wall (1) are positioned on the same level, and that when the unit is in use at least one tight side supporting tape (10) is provided between opposing ends of said side supporting walls (2) so as to additionally support the seed tape from the side, further characterised in that the side supporting walls (2) have a height (h) that the bottom wall (1) is of a zigzag cross section with a plurality of folds (u), and that each fold (u) of the zigzag folding of the bottom wall is less than 0.2 times the height (h) of the side supporting walls (2).

2. Carrier and transport unit as claimed in claim 1, characterised in that the sheet material is a thin sheet of aluminium or soft steel.

3. Carrier and transport unit as claimed in claim 1, characterised in that a plurality of holes (3) are punched out of the bottom wall so as to form a grating (13), and that the said connecting members are formed by relatively narrow bridge pieces (4) manufactured by a punching out of a plurality of narrow oblong holes (5) interspaced a short distance in said transition area.

4. Carrier and transport unit as claimed in claim 1, characterised in that the connecting members are formed by hinges (14) between each side supporting wall (2) and the bottom wall (1) as well as reinforcing angle braces (15) hinged thereon and placed at at least one end of each side wall (2).

5. Carrier and transport unit as claimed in claim 1, characterised in that the sheet material used is plastics and that the connecting members of the transition area are formed by metal wire nets (4) embedded in the plastics or merely by separate thin parallel metal wires (41).

6. Carrier and transport unit as claimed in claim 1, characterised in that the sheet material used is expanded plastics.

7. Carrier and transport unit as claimed in claim 1, characterised in that the connecting members of the transition area are formed by film hinges.

8. Carrier and transport unit as claimed in claim 1, characterised in that the side supporting band (10) is made of plastics, and provided with an adhesive on one side, said side supporting band being wound tightly about the unit, the band having portions opposing the side supporting walls (2) and adhering or being fastened to said unit.

9. Carrier and transport unit as claimed in claim 1, characterised in that the bottom web (1a) of the U presents a slightly con- cave curvature towards the interior of the U.

10. Carrier and transport unit as claimed in claim 1, characterised in that the side supporting walls (2) at one or both ends have been extended a length beyond the bottom wall (1), and that the extended length (2a) is bent inwards towards one of the centre lines (12) of the bottom wall.

11. Carrier and transport unit as claimed in claim 1, characterised in that the side supporting walls (2) are of a height (h) substantially corresponding to the width of the seed tape.

12. Carrier and transport unit as claimed in claim 1, characterised in that the side supporting walls (2) are equally high and preferably are of a height of less than 7 cm, whereas the bottom wall (1) is of a width (b) of 30 to 50 cm.

13. Carrier and transport unit as claimed in claim 1, characterised in that the adhesive tape (10) is of a width of 1.5 to 2.5 cm.

14. Carrier and transport unit as claimed in claim 1, characterised in that each side supporting wall (2) comprises at least one recess or hole (11) to be used when moving or positioning the unit.

15. Carrier and transport unit as claimed in claim 1, characterised in that the sheet material (1) is metal sheet coated polyethylene.

16. Carrier and transport unit as claimed in claim 1, characterised in that the sheet material is made exclusively of polypropylene.

17. Rack for storing a plurality of carrier and transport units according to claim 1, characterised in that it comprises four substantially vertical posts (14) interconnected by means of two interspaced frames (17', 17"), and that a plurality of holes arranged above one another are provided on the inner side of the posts (14).

18. Rack as claimed in claim 17, characterised in that the posts (14) thereof are provided with wheels (25).

* * * * *